(12) United States Patent
Bach et al.

(10) Patent No.: US 8,636,119 B2
(45) Date of Patent: Jan. 28, 2014

(54) PARTIALLY LINED DISK BRAKE HAVING A SPRING ARRANGEMENT FOR IMPROVED CLEARANCE AND SPRING ARRANGEMENT

(75) Inventors: Uwe Bach, Niedernhausen (DE); Wolfgang Ritter, Oberursel/Ts. (DE); Holger von Hayn, Bad Vilbel (DE); Ralf Sundheim, Frankfurt (DE); Ahmed Sefo, Frankfurt (DE); Jan Perlac, Zvolen (SK); Dieter Kristen, Dreieich (DE)

(73) Assignee: Continental Teves AG & Co. oHG (DE)

( * ) Notice: Subject to any disclaimer, the term of this patent is extended or adjusted under 35 U.S.C. 154(b) by 80 days.

(21) Appl. No.: 13/258,725

(22) PCT Filed: Mar. 17, 2010

(86) PCT No.: PCT/EP2010/053441
§ 371 (c)(1),
(2), (4) Date: Dec. 9, 2011

(87) PCT Pub. No.: WO2010/108830
PCT Pub. Date: Sep. 30, 2010

(65) Prior Publication Data
US 2012/0090927 A1    Apr. 19, 2012

(30) Foreign Application Priority Data

Mar. 25, 2009 (DE) .......................... 10 2009 001 832
May 26, 2009 (DE) .......................... 10 2009 022 633

(51) Int. Cl.
*F16D 55/22* (2006.01)
(52) U.S. Cl.
USPC ...................................... 188/72.3; 188/73.38
(58) Field of Classification Search
USPC .............. 188/72.3, 73.31, 73.36, 73.37, 18 A
See application file for complete search history.

(56) References Cited

U.S. PATENT DOCUMENTS

| 4,245,723 A | 1/1981 | Moriya |
| 4,629,037 A | 12/1986 | Madzgalla |

(Continued)

FOREIGN PATENT DOCUMENTS

| DE | 2902332 A1 | 8/1979 |
| DE | 3434421 | 4/1985 |

(Continued)

OTHER PUBLICATIONS

German Search Report issued in related Application No. DE 10 2009 022 633.8 dated Sep. 7, 2010 (with partial English translation).

(Continued)

*Primary Examiner* — Pamela Rodriguez
(74) *Attorney, Agent, or Firm* — RatnerPrestia

(57) ABSTRACT

A partially lined disk brake includes a brake anchor plate, mountable on which are two brake linings, which are arranged at a distance from one another and which between them are capable of receiving a brake disk capable of rotating about an axis of rotation, wherein an application movement serves to bring the two brake linings into engagement with a friction surface of the brake disk, including a brake caliper, which is arranged on the brake anchor plate and which engages at least partially over the brake linings and the brake disk, and which in the direction of movement of the brake linings can be displaced by an actuating device in relation to the brake anchor plate, wherein the actuating device produces the application movement of the brake linings, and having at least one spring element, which moves the brake linings away from one another again after an application movement.

14 Claims, 3 Drawing Sheets

(56) References Cited

U.S. PATENT DOCUMENTS

| | | | |
|---|---|---|---|
| 5,687,817 A | 11/1997 | Kobayashi | |
| 6,427,810 B2 * | 8/2002 | Schorn et al. | 188/73.39 |
| 7,086,506 B2 * | 8/2006 | Wemple et al. | 188/73.38 |
| 2004/0144602 A1 | 7/2004 | Ono | |

FOREIGN PATENT DOCUMENTS

| | | | |
|---|---|---|---|
| DE | 010238734 A1 * | 3/2004 | |
| EP | 0747609 B1 | 9/2001 | |
| EP | 1933054 A1 | 6/2008 | |
| WO | 9218786 | 10/1992 | |

OTHER PUBLICATIONS

International Search Report issued in PCT/EP2010/053441 filed Mar. 17, 2010, mailed Jun. 7, 2010.

* cited by examiner

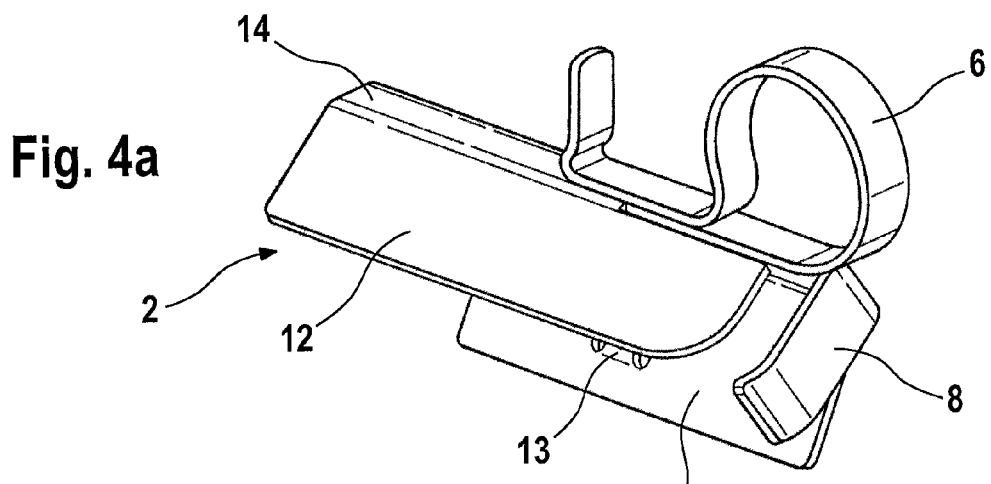
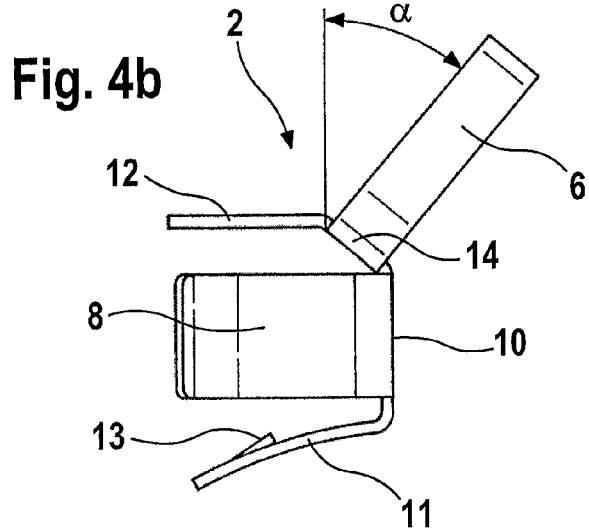
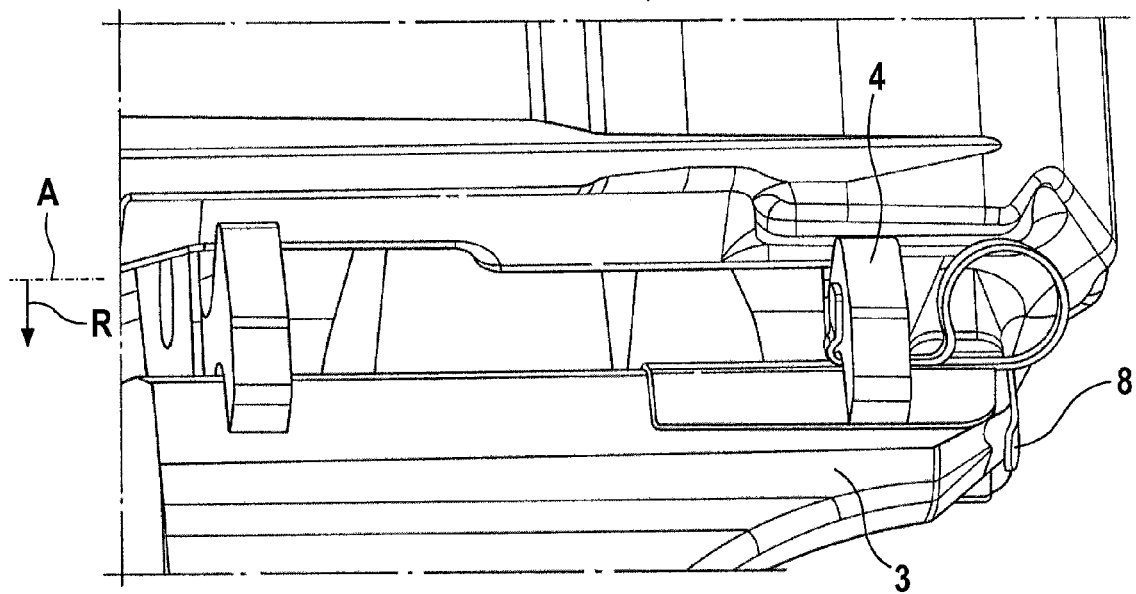

PARTIALLY LINED DISK BRAKE HAVING A SPRING ARRANGEMENT FOR IMPROVED CLEARANCE AND SPRING ARRANGEMENT

CROSS REFERENCE TO RELATED APPLICATIONS

This application is the U.S. National Phase Application of PCT International Application No. PCT/EP2010/053441, filed Mar. 17, 2010, which claims priority to German Patent Application No. 10 2009 001 832.8, filed Mar. 25, 2009, and German Patent Application No. 10 2009 022 633.8, filed May 26, 2009, the contents of such applications being incorporated by reference.

FIELD OF THE INVENTION

A partially lined disk brake.

BACKGROUND OF THE INVENTION

A partially lined disk brake of generic type is disclosed by EP 0 747 609 B1, which is incorporated by reference, and comprises a brake anchor plate, mounted on which are two brake linings, which are arranged at a distance from one another and which between them receive a brake disk capable of rotating about an axis of rotation, wherein an application movement serves to bring the two brake linings into engagement with a friction surface of the brake disk, comprising a brake caliper, which is displaceably arranged on the brake anchor plate and which engages over the brake linings and the brake disk, and forms a housing having an actuating device, wherein the actuating device produces the application movement of the brake linings, and having at least one spring element, which moves the brake linings away from one another again after an application movement. Here, the spring element is formed in one piece for both brake linings and comprises a stirrup portion, which engages over the brake disk and the two brake linings for improved clearance.

The design of the partially lined disk brake having a spring arrangement gives rise to a comparatively large sheet metal blanking wastage during the manufacturing process. A further disadvantage is that the housing for installing the spring arrangement requires a precisely adapted installation site, so that in-service retrofitting is not cost-effectively viable.

SUMMARY OF THE INVENTION

The present invention proposes a spring arrangement, which incurs low material costs whilst improving the lifting properties. The spring arrangement can be applied as easily as possible in existing large-scale production and to allow it to be retrofitted cost effectively to motor vehicles already delivered and in service through visits to a workshop.

According to an aspect of the invention a partially lined disk brake having a spring arrangement for improved clearance comprises a brake anchor plate, mountable on which are at least two brake linings, which are arranged at a distance from and parallel to one another and which between them are capable of receiving a brake disk capable of rotating about an axis of rotation (A), wherein an application movement serves to bring the two brake linings into engagement with the brake disk, comprising a brake caliper, which is arranged on the brake anchor plate and which engages at least partially over the brake linings and the brake disk, and which in the direction of movement of the brake linings can be displaced by an actuating device in relation to the brake anchor plate, wherein the actuating device produces the application movement of the brake linings, wherein the spring arrangement is suited and intended to move the brake linings away from the brake disk again after braking, wherein at least one separate spring arrangement is assigned to each brake lining, and wherein each of the spring arrangements comprises at least one substantially U-shaped retaining clamp, in such a way that the retaining clamp can be clamped to the brake anchor plate, and at least one separate spring leg, which impinges on the respective brake lining, is additionally provided, emerging from the retaining clamp.

For a comparatively low cost outlay, the invention affords a decisive contribution to fuel saving in a motor vehicle simply by a change of brake lining. Exemplary embodiments relate to advantageous applications of the invention. Further features and details of the invention are set forth in the dependent claims together with the description referring to the drawing.

BRIEF DESCRIPTION OF THE DRAWINGS

FIG. 4a-c: an additional embodiment of the invention from a number of viewpoints.

DETAILED DESCRIPTION OF THE DRAWINGS

Figure 1:
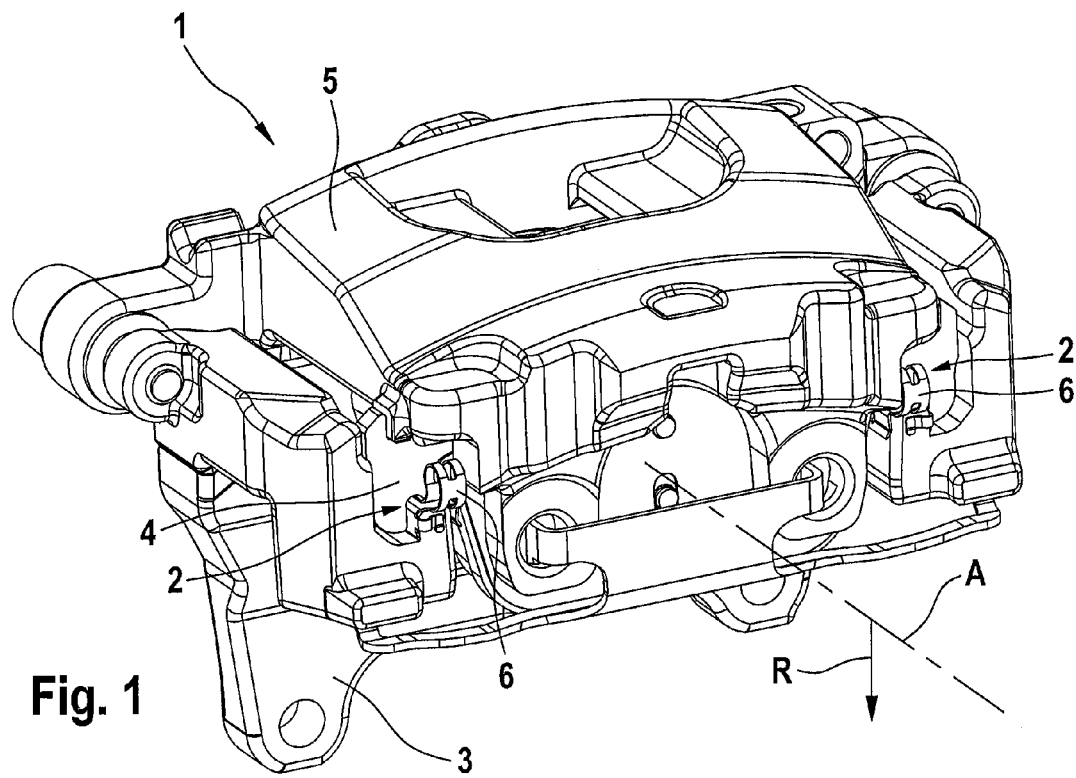
FIG. 1: a partially lined disk brake, assembled without the brake disk
Figure 2A:
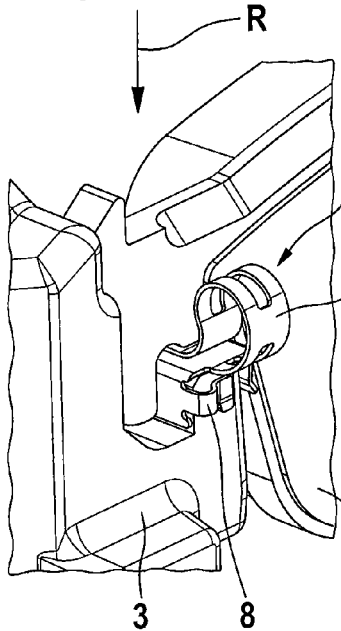
FIG. 2a-f: details of the springing of a brake lining
Figure 2B:
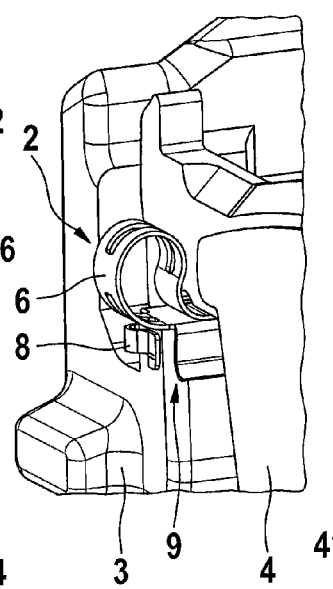
Figure 2C:
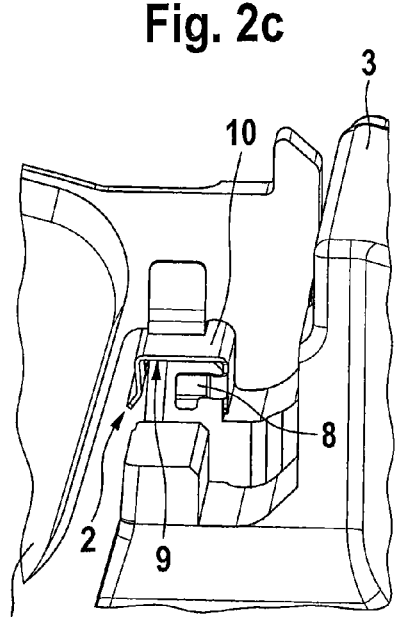
Figure 2D:
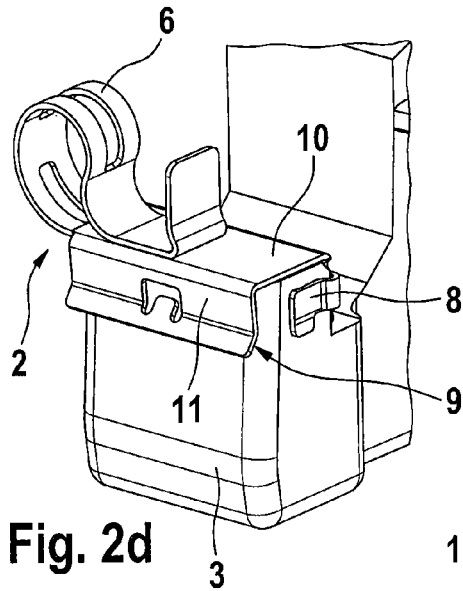
Figure 2F:
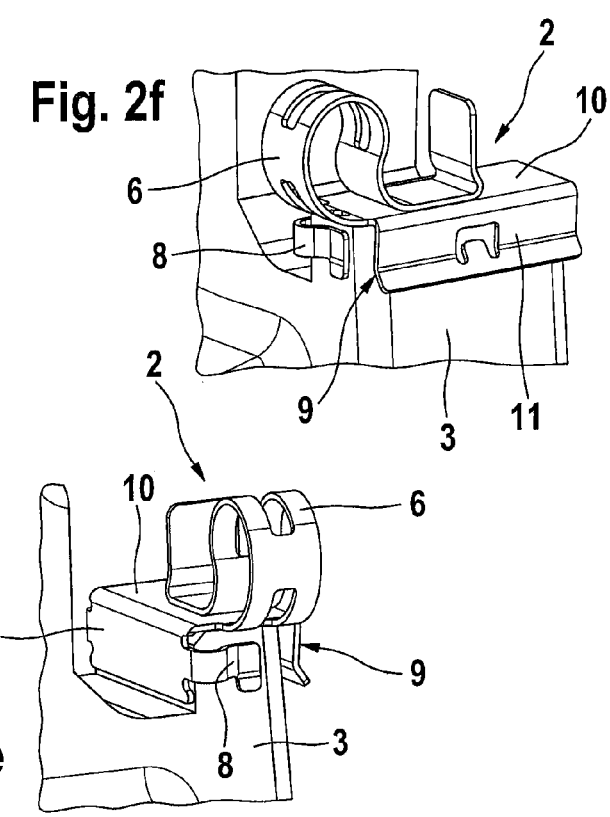
Figure 2E:
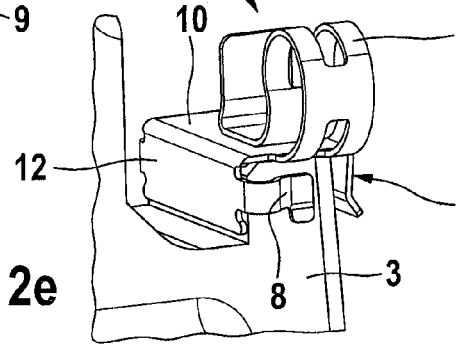

FIG. 1 shows a partially lined disk brake 1 having a spring arrangement 2 for improved clearance. This comprises a brake anchor plate 3, on which two brake linings 4 can be supported, arranged at a distance from one another. In this context it largely does not matter whether a tensile force bracing of the brake linings 4 in the brake anchor plate 3 with the aid of so-called hammer heads, or a pressurized force bracing of the brake linings 4 is provided, or some hybrid form of these two methods, in order to absorb the friction forces or torques occurring. What matters is that a brake disk (not shown) capable of rotating about an axis of rotation (A) can be provided between the brake linings 4, wherein an application movement serves to bring the two brake linings 4 into engagement with the brake disk. Also visible is a brake caliper 5 (floating caliper type), which is assigned to the brake anchor plate 3 and which engages at least partially over the brake linings 4 and the brake disk, and in the direction of movement of the brake linings 4 is provided with a hydraulic, mechanical or electromechanical actuating device for the brake linings, and is intended to be displaceable, that is to say floating, in relation to the brake anchor plate 3, parallel to the axis of rotation A, wherein the actuating device produces the application movement of the brake linings 4. Hybrid forms of these modes of actuation, in particular so-called electromechanically/hydraulically actuated combination calipers, are readily feasible, preferably when used as an electrical parking brake (EPB).

In the case of electromechanically actuated actuators, there is a certain advantage in being able to actively retract a brake lining that is directly impinged upon (usually a brake lining on a so-called piston or actuator side), in order to actively adjust its clearance. Selection of this actuator therefore affords an advantage in that the resultant residual torque fraction can be actively minimized by a directly actuated brake lining. The spring arrangement 2 according to aspects of the invention is proposed for the additional residual torque reduction of a brake lining, impinged upon directly by housing displacement, for example, especially on a so-called floating side, or if the actively adjusted amount of clearance is insufficient. This affords an especially cost-effective solution that is also suitable for retrofitting, in that a separate spring arrangement 2 having a separate spring leg 6 and a separate retaining leg 8 is provided for at least every brake lining 4, wherein the spring leg 6 elastically pretensions the relevant lining 4 in relation to the brake anchor plate 3, in such a way that after an application movement, in other words after an active brake actuation, it is moved away from the brake disk again. In principle, at least one separate spring arrangement 2 may also be assigned to each brake lining 4, but two spring arrangements 2 are preferably assigned to each one. In principle each of these spring arrangements 2 has at least one substantially U-shaped retaining clamp 9, comprising a base portion 10 and at right-angles to the latter two legs 11, 12 largely bent at right-angles, in such a way that the retaining clamp 9 can be frictionally clamped, relying on its spring action, directly onto a rail, bead or the like of the brake anchor plate 3. Assembly-facilitating contours in the form of tapered ramps, which fundamentally assist the clipping on and expansion of the retaining clamp, may be provided on the brake anchor plate 3. Said rail or bead may advantageously be provided with an undercut, in which the retaining clamp 9 engages after expansion, in such a way that a predominantly frictional retaining action is produced by positive interlock. For further enhanced, intensified fastening, a retaining claw 13, which is angled away out of a main direction of extent of the leg 11, 12, in such a way that an intensified retaining action on the brake anchor plate 3 is obtained, may be provided on the leg 11, 12. In order to apply the axially elastic retraction pretensioning force reliably to the brake lining 4, without the spring arrangement 2 shifting in the actuating direction (that is to say in the axial direction A) relative to the brake anchor plate 3, a retaining leg 8 is provided, emerging from at least one of the legs 11, 12 and substantially parallel to a bearing portion of the spring leg 6, ensuring that the spring arrangement 2 is fixed relative to the brake anchor plate 3. It will be apparent that the retaining leg 8 and the bearing portion of the spring leg 6 are arranged parallel to the brake disk.

As an alternative to these fastening variants, it is also feasible for each retaining claw 13 to engage through positive interlock in a recess of the brake anchor plate 3, or for the spring arrangement 2 to be of a design that is bolted to the brake anchor plate 3.

It must further be mentioned that the brake lining 4 bears directly on the brake anchor plate, that is to say by way of a contact surface of the spring leg and the base portion of the retaining clamp. In the preferred embodiment the bearing portion for this purpose undercuts a gap between a part of a so-called hammer head and the brake anchor plate. It will be apparent that such an additional recess has to be taken into account in the dimensioning and tolerances of a backing plate of the brake lining 4—in other words backing plates according to aspects of the invention are specially matched to the spring arrangement described. In the light of this, the spring arrangement 2 and the brake lining 4 form a unit specially adapted and matched to one another.

The direct bearing contact between the brake anchor plate 3 and the brake lining 4 results in a favorable metal friction ratio with favorable sliding ratios compared to conventional arrangements, in which the backing plate of the brake lining bears directly on the brake anchor plate 3. If the spring arrangement 2 is furthermore produced from stainless sheet steel, this affords not only favorable friction conditions but also advantages due to inhibited corrosion properties.

The spring arrangement 2 is more cost-effective to manufacture, compared to EP 0 747 609 B1, which is intended as a central spring for a pair of brake linings, because the sheet metal blanking wastage is minimized by separating the spring arrangements from the sheet metal material without the stirrup portion, that is to say individually but each offset in relation to another. In other words the offset and multi-piece configuration minimizes the sheet metal blanking wastage owing to flexible stamping tool design.

FIG. 4 illustrates a second embodiment, of which, for the sake of simplicity, only the differing features are described below. Here, the separate spring leg 6, emerging from the U-shaped retaining clamp 9 and viewed in a projection of the axis of rotation A, is provided on the retaining clamp 9 bent obliquely at an angle $\alpha$. This allows an arrangement whereby the spring arrangement 2 inserts in an especially compact manner substantially parallel to the contour of the brake anchor plate 3 into an available installation space (gap) between the brake anchor plate 3, the brake lining 4 and the brake caliper 5. As can further be seen, the retaining clamp 9, between the base portion 10 and the legs 11, 12, comprises an oblique intermediate portion 14, which likewise compactly conforms to an obliquely beveled three-dimensional contour of the brake anchor plate 3. In a further difference compared to the embodiment explained above, the retaining leg 8 is provided emerging from the base portion 10 of the retaining clamp. Consequently the fastening is accomplished in a compact and efficient manner.

Figure 3A:
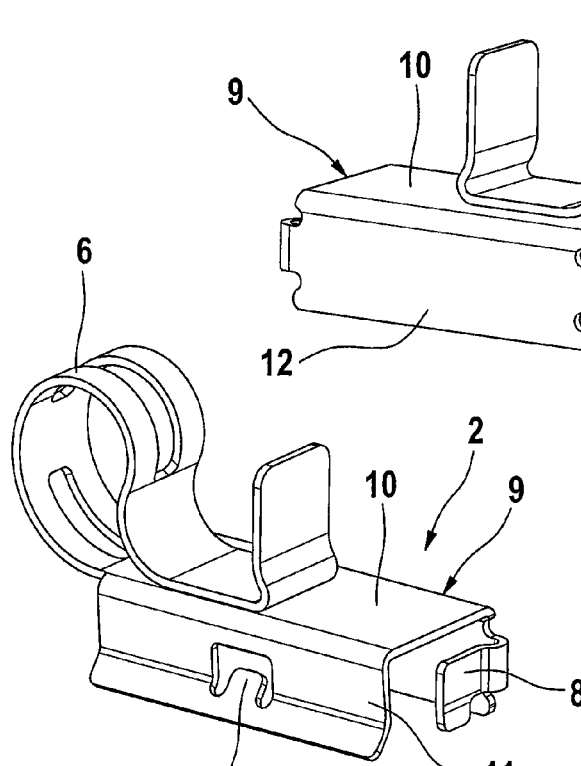
FIG. 3a-c: a spring arrangement as detached component.
Figure 3B:
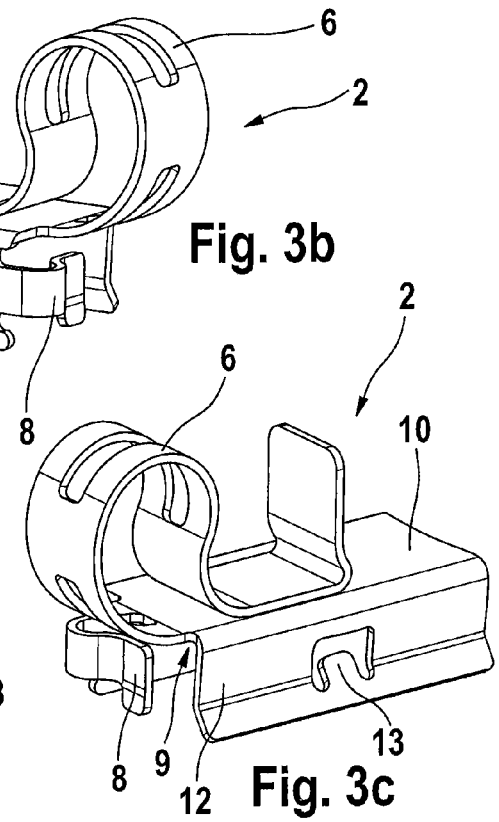
Figure 3C:
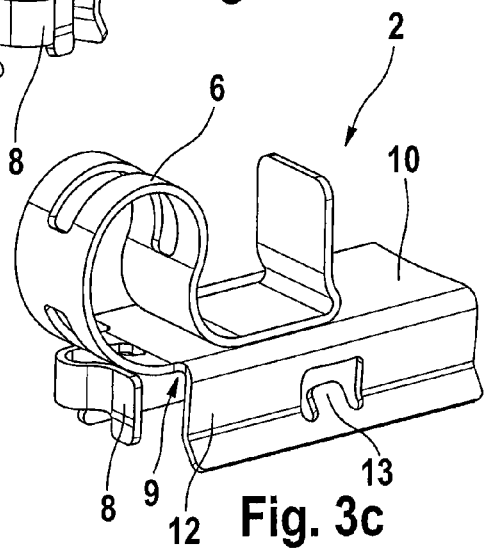

It goes without saying that hybrid forms with reversed features of the two embodiments described are feasible and are expressly incorporated into the scope of the patent, even if these further embodiments are not described word-for-word. It should be mentioned, merely by way of example, that the embodiment according to FIGS. 1-3 may be provided with a retaining leg 8 according to the embodiment in FIG. 4, or vice-versa.

The favorable effects of the invention are especially easy to achieve and can also be cost effectively applied by retrofitting to vehicles in service, in that in the case of these motor vehicle brakes—that is to say motor vehicle brakes in the possession of the final user—a replacement of existing brake linings is feasible using so-called retrofitting kits (brake linings with spring arrangement according to aspects of the invention). The applicant naturally claims partial protection in respect of the spring arrangement 2, in so far as this is marketed separately or as an integral part of said retrofitting kits (brake lining replacement set), for example, and in so far as this spring arrangement 2 is suited and intended, for example in conjunction with any previously known hydraulic/mechanical partially lined disk brakes, for achieve the advantageous effects of the invention for reducing residual brake torques, either on a floating side alone or both on the floating side and on the piston side of the partially lined disk brake.

LIST OF REFERENCE NUMERALS

1 partially lined disk brake
2 spring arrangement
3 brake anchor plate
4 brake lining
5 brake caliper
6 spring leg
7 retaining portion
8 retaining leg
9 retaining clamp 10 base portion
11 leg
12 leg
13 retaining claw
14 intermediate portion
A axis of rotation
R radial direction
α angle

The invention claimed is:

1. A partially lined disk brake having a spring arrangement for improved clearance, comprising:
a brake anchor plate, mountable on which are at least two brake linings, which are arranged at a distance from and parallel to one another and which between them are capable of receiving a brake disk capable of rotating about an axis of rotation (A), wherein an application movement serves to bring the two brake linings into engagement with the brake disk,
a brake caliper, which is arranged on the brake anchor plate and which engages at least partially over the brake linings and the brake disk, and which in the direction of movement of the brake linings is configured to be displaced by an actuating device in relation to the brake anchor plate,
wherein the actuating device produces the application movement of the brake linings,
wherein the spring arrangement is configured to move the brake linings away from the brake disk again after braking,
wherein at least one separate spring arrangement is assigned to each brake lining,
wherein each of the spring arrangements comprises at least one substantially U-shaped retaining clamp,
wherein the retaining clamp is configured to be clamped to the brake anchor plate, and
wherein at least one separate spring leg, which impinges on the respective brake lining emerges from the retaining clamp, the spring leg comprising at least one portion extending adjacent and substantially parallel to a surface of the respective brake lining facing the brake disk.

2. The partially lined disk brake having a spring arrangement as claimed in claim 1 further comprising a retaining leg emerging from the retaining clamp that bears on the brake anchor plate in such a way that an elastic pre-tensioning exists between the respective brake lining and the brake anchor plate, wherein the brake lining is substantially impinged upon elastically in the opposite actuating direction.

3. The partially lined disk brake having a spring arrangement as claimed in claim 2, wherein the retaining leg and the spring leg are arranged substantially parallel to a friction surface of the brake disk.

4. The partially lined disk brake having a spring arrangement as claimed in claim 1, wherein the respective brake lining bears directly on the brake anchor plate by way of a bearing portion of the spring leg and by way of a base portion of the retaining clamp, in a radial direction (R) relative to the axis of rotation (A) of the brake disk.

5. The partially lined disk brake having a spring arrangement as claimed in claim 4, wherein a substantially low-friction, metallic friction between identical friction materials is afforded between the bearing portion and the base portion.

6. The partially lined disk brake having a spring arrangement as claimed in claim 4, wherein the bearing portion of the spring leg is bent substantially at right-angles for bearing on the respective brake lining.

7. The partially lined disk brake having a spring arrangement as claimed in claim 4, wherein the retaining clamp, emerging from the base portion, comprises at least two legs, the legs arranged parallel to one another, and wherein at least one of the legs comprises a retaining claw.

8. The partially lined disk brake having a spring arrangement as claimed in claim 7, wherein the retaining claw is bent in relation to a leg of the retaining clamp, in such a way to enhance retaining action on the brake anchor plate.

9. The partially lined disk brake having a spring arrangement as claimed in claim 7, wherein the base portion and legs of each spring arrangement are arranged substantially parallel to the axis of rotation (A) and parallel to a contour of the brake anchor plate.

10. A spring arrangement for a partially lined disk brake, comprising:
a brake anchor plate, mountable on which are at least two brake linings, which are arranged at a distance from one another and which between them are capable of receiving a brake disk capable of rotating about an axis of rotation (A),
wherein an application movement serves to bring the two brake linings into engagement with the brake disk,
a brake caliper, which can be arranged on the brake anchor plate and which engages at least partially over the brake linings and the brake disk, and which in the direction of movement of the brake linings is configured to be displaced by an actuating device in relation to the brake anchor plate,
wherein the actuating device produces the application movement of the brake linings,
wherein one spring arrangement, in each case, is intended to move one brake lining away from the brake disk again after an application movement,
wherein the one spring arrangement comprises a U-shaped retaining clamp comprising a base portion, legs emerging from the base portion and a separate spring leg for impinging on the brake lining, the spring leg comprising at least one portion extending adjacent and substantially parallel to a surface of the brake lining facing the brake disk,
wherein the retaining clamp is configured to be frictionally clipped to the brake anchor plate, and
wherein the spring arrangement comprises a separate retaining leg, which is bent at right-angles to the axis of rotation (A), and impinges on the brake anchor plate, and thereby fastens the spring arrangement to the brake anchor plate in the direction of the axis of rotation (A).

11. The spring arrangement for a partially lined disk brake as claimed in claim 10, wherein the retaining leg emerges from one of the legs.

12. The spring arrangement for a partially lined disk brake as claimed in claim 10, wherein the separate spring leg, emerging from the U-shaped retaining clamp, is bent obliquely at an angle α in a projection direction of the axis of rotation (A).

13. The spring arrangement for a partially lined disk brake as claimed in claim 10, wherein the retaining clamp comprises an oblique intermediate portion between the base portion and the legs.

14. The spring arrangement for a partially lined disk brake as claimed in claim 10, wherein the retaining leg emerges from the base portion of the retaining clamp.

* * * * *

UNITED STATES PATENT AND TRADEMARK OFFICE
CERTIFICATE OF CORRECTION

PATENT NO. : 8,636,119 B2  Page 1 of 1
APPLICATION NO. : 13/258725
DATED : January 28, 2014
INVENTOR(S) : Bach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 155 days.

Signed and Sealed this
Twenty-second Day of September, 2015

Michelle K. Lee
*Director of the United States Patent and Trademark Office*